Figure 1:
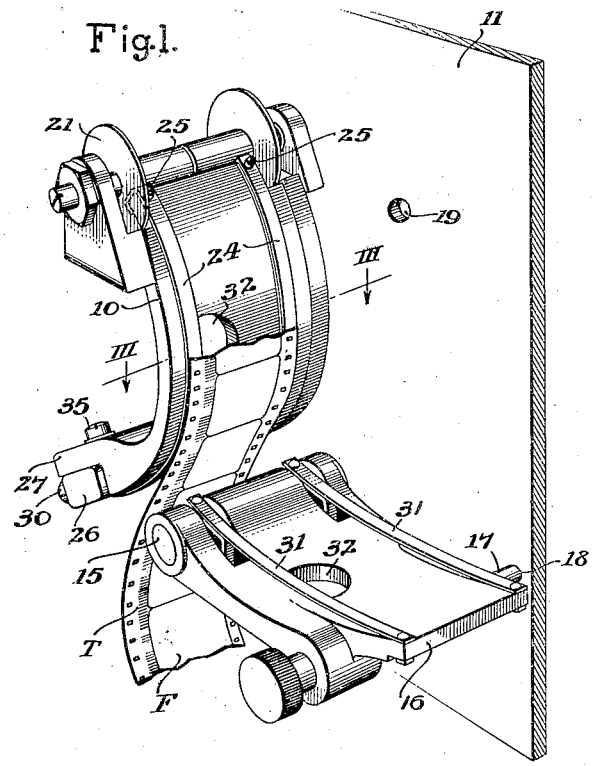

Feb. 19, 1935.  W. A. SCHULZ  1,991,870

FILM GATE

Filed Feb. 25, 1931

INVENTOR
Walter A. Schulz,
BY *R. Goldsborough*
HIS ATTORNEY.

Patented Feb. 19, 1935

1,991,870

UNITED STATES PATENT OFFICE 1,991,870

FILM GATE

Walter Albert Schulz, Oaklyn, N. J., assignor, by mesne assignments, to Radio Corporation of America, New York, N. Y., a corporation of Delaware Application February 25, 1931, Serial No. 518,071

2 Claims. (Cl. 88—17)

My invention relates to film gates such as are utilized in the projection of moving pictures and in reproducing sound either independently of or in conjunction with such pictures.

In some types of sound reproducing apparatus, a film bearing a sound track is passed from a feed drum or reel, through a sound gate where the sound is taken off, and thence to a take-up reel onto which the film is wound. The sound gate is usually formed of a suitably curved contour and the aperture plate thereof, generally constituting the running surface for the film, is made exceedingly smooth to reduce friction between the film and the aperture plate in passing through the gate, and also to prevent, so far as possible, injury to the film, as, for example, through scratching. To this end, the aperture plate is usually made of steel which has been machined, hardened, and finished to a highly polished surface.

In addition to moving the film through the sound gate at a uniform rate, it is essential, if faithful reproduction of the sound is to be obtained, that every element in the surface of the curved aperture plate bear the same angular relation to a given plane in order to obviate twisting or lateral side-slipping of the film as it passes through the gate. The process of hardening the aperture plate and subjecting it to temperature changes is not only expensive, but very often warps the aperture plate to such an extent that it is necessary to reject it as unfit for use. In accordance with my invention, these difficulties are avoided by the provision of film bearing surface members which are readily attached to or detached from the aperture plate. As will be readily understood, this construction has the important advantage that the useful life of the film gate may be maintained indefinitely merely by replacing the film bearing surface members when they become worn.

One object of my invention is to produce an improved sound gate wherein the aperture plate may be formed with any desired curvature or contour, this having been in many cases extremely difficult, if not impossible, heretofore, because of the difficulty of machining plates having certain desirable contours.

A further object of my invention is to provide an improved sound gate wherein the aperture plate need not be processed and finished to such a fine and accurate state as was heretofore necessary.

Another object of my invention is to provide an improved sound gate wherein it is not necessary to provide an aperture plate which is hardened and has a highly polished, smooth, running surface for the film.

A further object of my invention is to provide an improved sound gate having a smooth running surface for the film which can easily, quickly, and inexpensively be removed and replaced when it has become worn or otherwise unfit for use.

Still a further object of my invention is to provide an improved sound gate of the type set forth which will be rugged, durable in construction and efficient in use, as well as being compact and well suited to the requirements of commercial manufacture.

Figure 2:
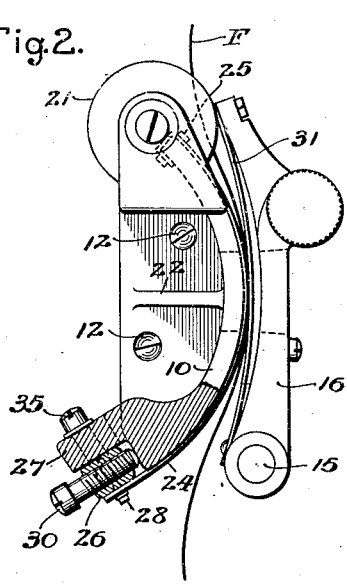
Figure 3:
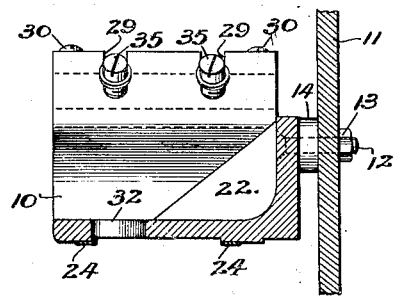

The novel features of my invention are set forth with particularity in the appended claims, the invention itself, however, both as to its organization and its method of operation, together with additional objects and advantages thereof, being best understood from the following description of a specific embodiment, when taken in connection with the accompanying drawing in which Figure 1 is a perspective view of a sound gate in open position and showing my invention applied thereto, Fig. 2 is a side elevation of the sound gate in closed position, and Fig. 3 is a sectional view taken on the line III—III of Figure 1 and in the direction of the arrows.

Referring to the drawing wherein similar reference characters indicate corresponding parts throughout, my improved film gate comprises a curved aperture plate 10 fixed to a support 11 by any suitable means, as, for example, bolts 12 and nuts 13, the curved plate 10 preferably being spaced from the support 11, as by washers 14. A shaft 15 is also fixed to the support 11 adjacent the stationary plate 10, and a movable plate 16 is mounted on the shaft 15 for pivotal movement toward and away from the stationary plate 10. A plunger 17, urged toward the support 11 by means of a spring (not shown) locks the movable plate 16 in open position, as shown in Fig. 1, by engaging the opening 18 in the support 11 and in closed position, as shown in Fig. 2, against the fixed or stationary aperture plate 10 by engaging the opening 19, also in the support 11. When in closed position, the two plates 10 and 16 cooperate to apply a slight tension to the film in its passage through the gate, a flanged guide roller 21 serving to guide the film.

As heretofore pointed out, my improved film gate may be utilized as either a picture or sound gate. One of the requirements for faithful reproduction of sound is that the running surface for the film be at all points perfectly square. In other words, the running surface of the sound gate must bear the same angle to its support at all points thereof, and preferably be perpendicular thereto. It has been customary, therefore, to make the aperture plate 10 to accurate dimensions and to so mount it on the support 11 that the elements in the curved surface thereof are, so far as possible, at right angles to the support 11. Were it not for the fact that the running surface for the film must also be hard to resist wear, and perfectly smooth to avoid marring the film, there would be relatively little difficulty in mounting the aperture plate 10 on the support 11 in the manner described. However, due to the hardening process which the plate undergoes to render it fit for wear and the subsequent finishing to provide a smooth surface thereon, the plate is likely to be deformed and thus fail in the requirement of a true running surface.

According to my invention, I preferably cast the plate 10 of any suitable material and machine it to the desired form and dimensions, a web 22 being provided thereon to impart strength and rigidity thereto. The plate 10 may, if desired, also be made of formed steel, or it may be made in any other suitable manner, but in any case, I desire to have it understood that the plate 10 is not hardened and need not be ground and polished to a fine finish. By eliminating this processing, the hazard of warping is also eliminated almost entirely and, consequently, the plate may be mounted on its support so that it will be perfectly square.

Furthermore, the elimination of this processing makes it possible to shape the aperture plate 10 to any desired curvature, particularly when it is made of formed steel which may be bent into shape, this having been heretofore impractical in many cases due to the difficulty of machining.

In order to provide a suitable running surface for the film, I mount a pair of rails 24 on the plate 10, which rails extend above the surface of the plate 10 and form a track over which the film travels. The rails 24 are formed of hardened, smoothly finished, preferably highly polished steel, clock spring steel being particularly well fitted for this purpose since it is already hard and smooth, has a very fine grain, usually much finer than the grain of the plate 10, is resilient, and requires no further processing. The rails 24 are also, preferably, of uniform thickness throughout and may be screwed, bolted, or otherwise attached to the plate 10 at one end. I preferably employ small screws or bolts, as 25, for fastening the rails 24 to the plate 10, since this permits the rails to be easily and quickly removed, when worn or otherwise found unfit for use, and replaced by new rails. At their other ends, the rails are attached to a block 26, slidably mounted on the offset portion 27 of the plate 10, the rails 24 being attached to the block 26 by means of screws 28. Adjusting screws or bolts 35 extend through the offset portion 27 and thread into the block 26, the bolts 35 being slidable in slots 29 formed in the offset 27 for a purpose hereinafter described.

The rails 24 may first be screwed to the plate 10 at their upper ends by means of the screws or bolts 25 and then attached to the block 26 by means of the screws 28 with the heads of the screws 35 falling slightly short of the offset 27.

A pair of screws 30, threaded in the block 26 and bearing against the bottom end 31 of the plate 10, are then manipulated to apply tension to the rails 24, the screws 35 moving in the slots 29 which form guideways therefor. This causes the rails 24 to assume the contour of, or the same curvature as, the curved plate 10 and also to snugly fit over the plate 10. When the rails 24 have been suitably adjusted, the screws 35 are then turned until their heads bear against offset 27, whereupon the offset 27 is clamped between the heads of the screws 35 and the block 26, thereby locking the rails 24 in their adjusted position. Since the plate 10 is already square with respect to support 11, the rails 24 will be similarly related to the support.

The movable plate 16 is provided with a pair of thin, flexible shoes 31 of suitable material which, when the plate 16 is closed against the plate 10, bear on the rails 24 at a substantial portion of their length, as clearly shown in Fig. 2. Consequently, when a film F, bearing sound track T, is threaded in the sound gate, the shoes 31 press the film F into gentle, but firm, engagement with the rails 24. Inasmuch as the rails 24 are true, as indicated above, the sound will be faithfully reproduced by means of light passing through the aligned apertures 32 and penetrating the film and subsequently falling upon and actuating a photoelectric device, all of which is well known to those skilled in the art and need not be described in greater detail here.

From the foregoing description, it will be obvious that I have provided a film gate wherein the expensive processing of the aperture plate may be almost entirely dispensed with, but which, nevertheless, provides a smooth running surface or track for the film. Not only is warping of the aperture plate eliminated in my improved gate, but it is possible to form the aperture plate therein of any suitable shape or curvature and to provide a running surface for the film which will readily conform thereto, which can be easily adjusted thereon, and which, when worn, can be replaced with ease and speed.

Although I have shown and described a certain specific embodiment of my invention, I am fully aware that many modifications thereof are possible. Furthermore, although I have shown my invention as applied to a sound gate, it will be obvious that it may equally well be applied to picture gates. My invention, therefore, is not to be restricted except insofar as is necessitated by the prior art and by the spirit of the appended claims.

I claim as my invention:

1. An aperture plate having a curved surface of the type generated by the movement of a line around an axis parallel thereto, the said surface being characterized by the presence of minor imperfections and irregularities detrimental to film-life, a plurality of spaced apart flexible rails mounted on the plate and extending in the direction of curvature thereof, and means for tensioning the rails against the said surface to cause them to partake of the general curvature thereof, the said rails being of a material providing smooth film-supporting surfaces.

2. The invention set forth in claim 1 characterized in that the rail material is tempered steel of watch-spring quality.

WALTER ALBERT SCHULZ.